United States Patent
Lee et al.

(10) Patent No.: US 6,532,362 B1
(45) Date of Patent: Mar. 11, 2003

(54) OVER THE AIR SERVICE PROVISIONING (OTASP) METHOD IN MOBILE COMMUNICATION SYSTEM

(75) Inventors: Kwang Hoon Lee, Seoul (KR); Young Dae Yu, Yongin-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/349,617

(22) Filed: Jul. 9, 1999

(30) Foreign Application Priority Data

Jul. 10, 1998 (KR) .............................. 98-27972

(51) Int. Cl.⁷ .......................... H04M 3/00; H04L 12/28
(52) U.S. Cl. .................. 455/419; 455/445; 455/554; 370/392; 370/352
(58) Field of Search .............................. 455/435, 419, 455/445, 418, 414, 554, 555; 370/389, 352, 353, 354, 355, 392, 422

(56) References Cited

U.S. PATENT DOCUMENTS

| | | | | |
|---|---|---|---|---|
| 5,603,084 A | * | 2/1997 | Henry, Jr. et al. | 455/419 |
| 5,878,339 A | * | 3/1999 | Zicker et al. | 455/419 |
| 6,144,849 A | * | 11/2000 | Nodoushani et al. | 455/419 |
| 6,188,899 B1 | * | 2/2001 | Chatterjee et al. | 455/435 |
| 6,223,028 B1 | * | 4/2001 | Chang et al. | 455/419 |
| 6,282,421 B1 | * | 8/2001 | Chatterjee et al. | 455/435 |

* cited by examiner

Primary Examiner—William Trost
Assistant Examiner—Rafael Perez-Gutierrez
(74) Attorney, Agent, or Firm—McKenna Long & Aldridge LLP

(57) ABSTRACT

The present invention relates to a temporary reference number (TRN) for Over The Air Registration (OTAR) of a mobile telephone, particularly to Over The Air Service Provisioning (OTASP) method by using the TRN in mobile communication system.

The TRN packet includes a header code having fixed bits for indicating the OTAR request call through the OTASP, a point code having fixed bits for identifying the exchange which switches the OTAR call through the OTASP, and a mobile telephone identity code having fixed bits for identifying the mobile telephone which requests the OTAR call.

6 Claims, 4 Drawing Sheets

OVER THE AIR SERVICE PROVISIONING (OTASP) METHOD IN MOBILE COMMUNICATION SYSTEM

BACKGROUND

1. Field of the Invention

The present invention relates to a temporary reference number(TRN) for Over The Air Registration(OTAR) of a mobile telephone, particularly to an Over The Air Service Provisioning(OTASP) method by using the TRN in a mobile communication system. When a mobile telephone requests a registration through the OTASP system, the call is directly connected to an OTASP operator of a Customer Care Service Center(CCSC) and a corresponding exchange may be easily distinguished which connects the call while a user of the mobile telephone communicates with the OTASP operator of the CCSC. Thus, the present invention relates to the OTASP method of a mobile communication system by using the TRN to efficiently provide the OTAR of the mobile telephone.

2. Description of the Related Art

Generally, the OTAR is a kind of service to subscribe and register with a mobile communication provider through the OTASP by using the mobile telephone without visiting certain places(for example, mobile communication agencies, CCSC, and so on). To accomplish an OTAR, it is required that a mobile telephone which is not subscribed yet, calls the CCSC and the user of the mobile telephone may communicate with the OTASP operator of the CCSC to give required information. Accordingly, the call generated from the mobile telephone which is not subscribed/or registered, may be connected from an exchange to the CCSC, and the subscriber of the mobile telephone may communicate with the OTASP operator of the CCSC on the phone. This is shown in Mobile Communication Standard(TIA/EIA/IS-725, TIN/EIA/IS41, TIA/EIA/IS-683; CDMA, TIA/EIA/IS-136; TDMA).

When the call is generated from the mobile telephone for subscribing to corresponding mobile communication service, a corresponding exchange which switches the call of the mobile telephone transmits voice information with a TRN to the CCSC through a Common Channel Signaling (CCS), in which the TRN includes information about the call. The CCS includes speech channel and signal channel respectively, and the signal channel has flexible signal information for controlling the several speech channels. Accordingly, the CCS may send/receive the call signal while the line is busy. And the CCS is used for carrying out registration to receive voice information of the subscriber and mobile telephone information, because it reduces the transmission time, and may transmit the data bi-directionally.

In the method of registering a mobile telephone through the conventional OTASP, the structure of the TRN has not been defined, and there has been nothing about a particular standard which discriminates an exchange connecting the call from other exchanges between the mobile telephone subscriber and the OTASP operator of the CCSC.

SUMMARY

Accordingly, in order to solve the problems in the prior art it is an object of the present invention to provide an Over The Air Service Provisioning(OTASP) method of a mobile communication system of efficiently registering a mobile telephone through OTASP by transmitting a TRN packet to a CCSC, enabling establishing data networks between the CCSC and the mobile telephone in the case that a plurality of exchanges operate. The TRN includes information about a registration request call, exchange which switches the call, and the corresponding mobile telephone, respectively.

One embodiment to achieve the above object is to provide an OTASP method of the mobile communication system generating a TRN by an exchange through OTASP, transmitting the TRN to OTAF system, and providing OTAR of a mobile telephone through the OTAF system, comprising the processes of:

inserting information for discriminating an OTAR request call from other calls, information for discriminating the exchange itself from other exchanges, and information about the mobile telephone requesting the OTAR request call, in the TRN packet, and transmitting the TRN packet having the information to the OTAF system through a Private Automatic Branch Exchange (PABX) and a CCSC, and establishing a data transmission path capable of data exchange between the OTAF system and the mobile telephone, and thereby providing the OTAR of the mobile telephone.

Particularly, the TRN packet includes header code having fixed bits for indicating the OTAR request call through the OTASP, point code having fixed bits for identifying the exchange which switches the OTAR call through the OTASP, and mobile telephone identity code having fixed bits for identifying the mobile telephone which requests the OTAR call.

And the OTASP method according to the present invention comprises:

a) in the exchange, after receiving the OTAR request call, generating the TRN packet having information about an OTAR request call being currently connected through the OTAF system, exchange identity information, and mobile telephone identity information, and transferring the TRN packet having the information and voice call to the PABX, b) in the PABX, determining whether it has an OTAR request call after checking the TRN packet from the exchange, and directly transmitting the TRN packet and the voice call to an OTASP operator and operator server of the CCSC in the case of an OTAR request call, and c) in the CCSC, transmitting the TRN packet to the OTAF system in order to activate a data transmission path for data exchange with the mobile telephone, and d) in the OTAF system, establishing a data transmission path which is connected to the exchange and the mobile telephone after checking the TRN packet.

BRIEF DESCRIPTION

Other objects, features, and advantages of the present invention will become more apparent from the following detailed description when read in conjunction with the accompanying drawings, in which.

DETAILED DESCRIPTION OF THE PREFERRED EMBODIMENTS

Embodiments of the invention will be described with reference to figures.

Figure 1:
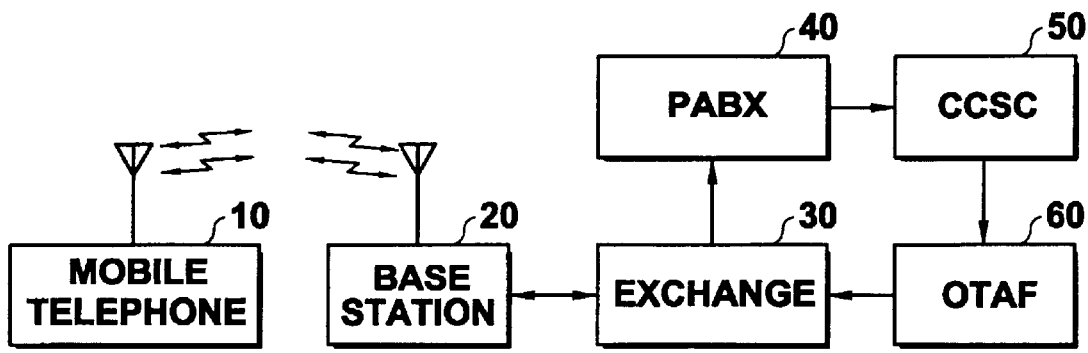
FIG. 1 shows a block diagram to explain an OTASP method of a mobile communication system according to the present invention.

FIG. 1 shows a block diagram to explain an OTASP method of a mobile communication system according to the present invention. Referring to FIG. 1, the mobile communication system includes a mobile telephone 10 which is not registered, a base station 20 where the mobile telephone 10 is located, an exchange 30 which switches a call generated by the mobile telephone 10, a Private Automatic Branch Exchange(PABX) 40 which each mobile communication provider has, a CCSC 50 which registers the mobile telephone 10, takes counsel with the user of the mobile telephone 10 and manages charging rules, and so on, and an Over The Air service provisioning Function(OTAF) system 60 providing the OTASP to the subscriber who desires an Over The Air Registration(OTAR).

The mobile telephone 10 includes an identity number, key code, and so on for the OTAR through the OTASP.

The base station 20 sends/receives data between the exchange 30 and the mobile telephone 10.

The exchange 30 generates a TRN packet in order to transmit data between the mobile telephone 10 and the CCSC 50, in the case that a call of the mobile telephone 10 applied from the base station 20 requests the OTAR through the OTASP. The TRN packet includes a header code for discriminating the OTAR call from other calls, a point code which is an identity code of the corresponding exchange 30, and a mobile telephone identity code for discriminating the mobile telephone 10 which requests the OTAR from other mobile telephones.

Figure 2A:
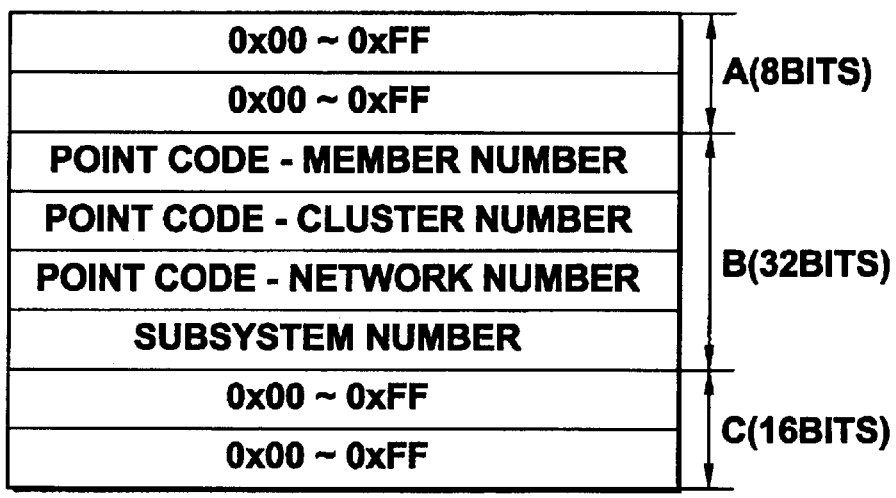
FIGS. 2a to 2c show diagrams of packet structure of each TRN packet standard generated in the exchange for efficiently providing the OTASP method of the mobile communication system according to the present invention.
Figure 2B:
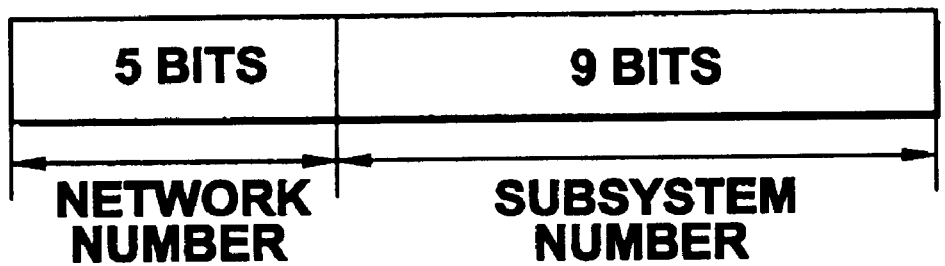
Figure 2C:
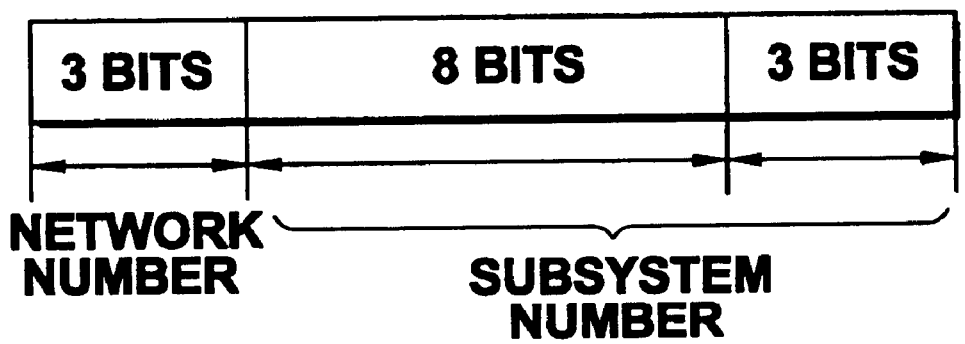

FIG. 2a shows an example of North America standard which is comprised of a total of 56 bits, i.e, an 8 bit-header code(a), a 32 bit-point code(b), and a 16 bit mobile telephone identity code(c). FIGS. 2b and 2c show only point code of an exchange in an ITU-T standard. For example, as indicated in the ITU-T standard, the point code(b) of the exchange may include a subsystem number for dividing kinds of equipment(such as, Home Location Register, exchange, and etc.) and a network number for dividing regions. In North America standard, the point code(b) also may include subsystem number for dividing kinds of equipment(such as, Home Location Register, exchange, and etc.), network number for dividing regions, cluster number for dividing kinds of node which is used for sub-concept of the network number, and exchange number for dividing a corresponding exchange in the corresponding region.

Accordingly, the exchange generates the TRN packet, applies to the PABX 40, selects the mobile telephone identity code(c) from the TRN packet applied from the OTAF system 60, and activates a data transmission path with the mobile telephone 10 which requests the OTAR through the OTASP.

The PABX 40 selects the header code(a) which discriminates types of calls from the TRN applied from the exchange 30, and connects the corresponding call to the OTASP operator of the CCSC 50 in the case that the call requests the OTAR through the OTASP.

The CCSC 50 receives credit information for the user by speaking over the phone through a speech channel between the OTASP operator and the user, when the call through the OTASP from the PABX 40 is connected to an OTASP operator server. In addition, while the user speaks to the OTASP operator, the CCSC 50 transfers the TRN applied from the PABX 40 to the OTAF system 60, and carries out a registration procedure for the mobile telephone 10 by the OTAF system 60.

The OTAF system 60 selects the point code(b) which is an exchange identity code from the TRN packet applied from the CCSC 50, detects which exchange 30 switches the OTAR request call, and transmits a Short Message Delivery Point to Point(SMDPP) including the TRN packet to the exchange 30 by using a CCS.

Figure 3A:
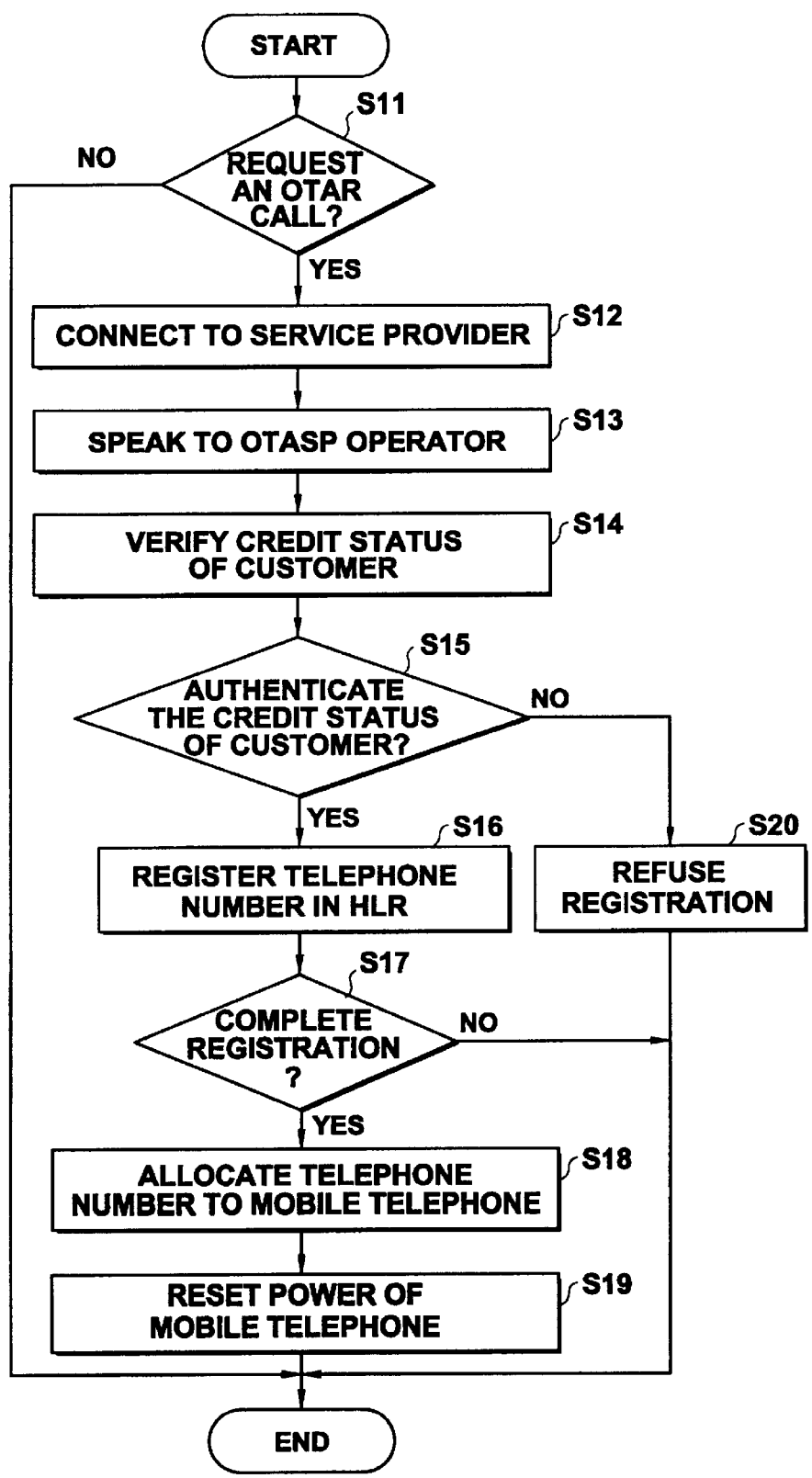
FIG. 3a shows a flowchart indicating an OTAR procedure of the mobile telephone in order to explain the OTASP method of the mobile communication system according to the present invention.
Figure 3B:
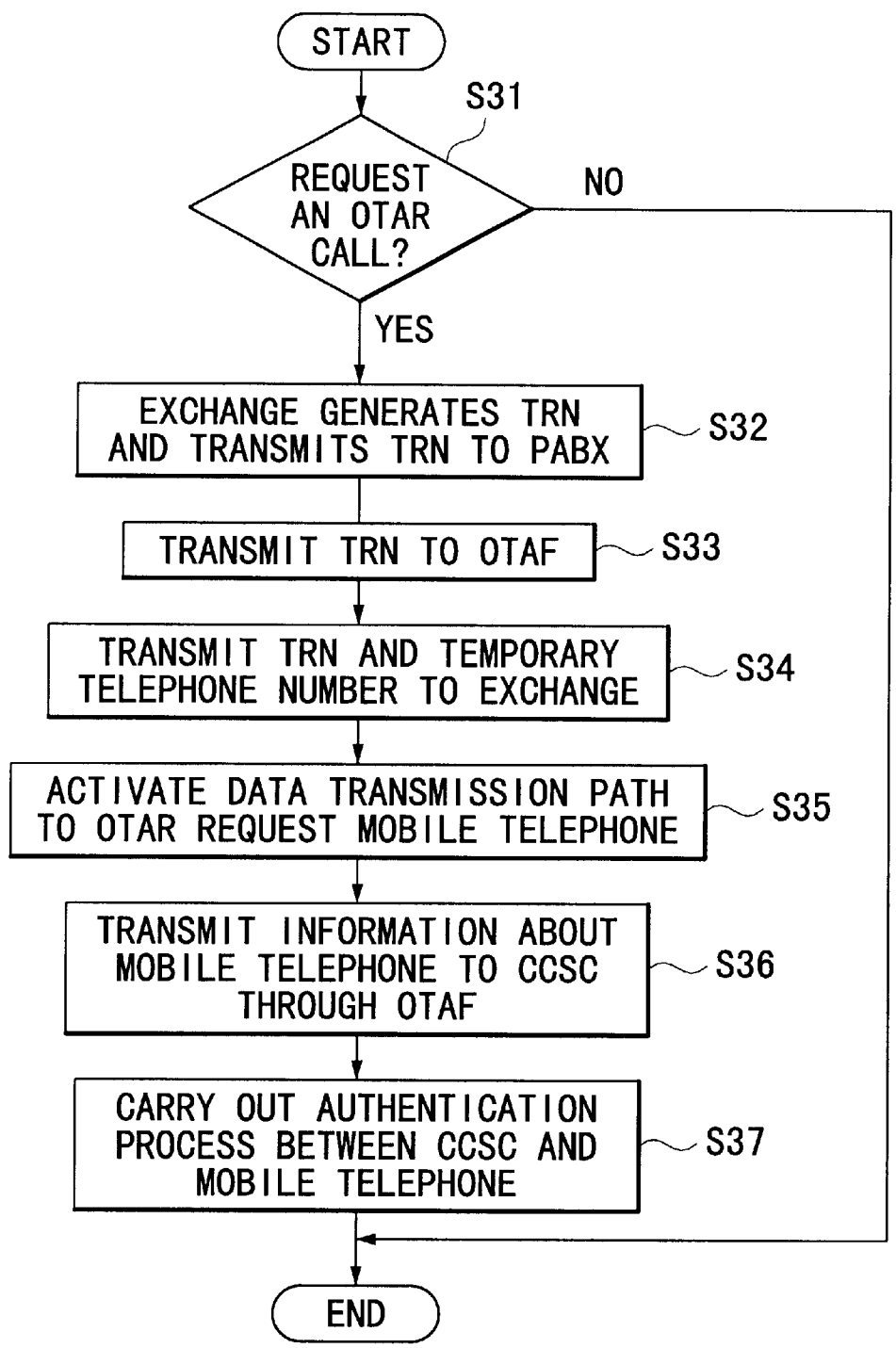
FIG. 3b shows a flowchart explaining a TRN packet transmitting procedure in the OTASP method of the mobile communication system according to the present invention.

FIG. 3a shows a flowchart indicating an OTAR procedure of the mobile telephone while a user of the mobile telephone speaks to an OTASP operator of a CCSC according to the present invention. FIG. 3b shows a flowchart explaining a TRN packet transmitting procedure in the OTASP when the mobile telephone requests the OTAR.

The OTAR procedure of the mobile telephone includes the steps of: generating an OTAR request call through the OTASP by which a user desires to subscribe to the corresponding mobile communication service, using a mobile telephone which is not registered(S11); connecting the call to a corresponding mobile communication provider through the base station, exchange, and PABX(S12); identifying the user's credit status by verifying the required information of the mobile telephone registration as the user speaks to an OTASP operator; refusing the service registration or registering a phone number in the HLR according to the identification result(S13–S17, S20); and completing the registration through the OTASP by resetting the power of the corresponding mobile telephone after allocating the phone number(S18, S19).

The TRN packet transferring procedure in FIG. 3b includes the steps of: in the exchange, generating the TRN packet having information of an OTAR request call being currently connected, exchange identity information, and mobile phone identity information after receiving the OTAR request call through the OTASP, and transferring the information and voice call to the PABX(S31, S32); in PABX, determining whether it has an OTAR request call after checking the TRN packet transmitted from the exchange; transmitting the TRN packet and the voice call to the OTASP operator and operator server of the CCSC in case of an OTAR request call(S33); in the CCSC, transferring the TRN packet to the OTAF system in order to activate a data transmission path for data exchange with the mobile telephone(S34); in OTAF system, establishing the data transmission path which is connected to a corresponding exchange and mobile telephone after checking the TRN packet(S35). Finally, the CCSC takes the required information from the mobile telephone through the OTAF system and carries out an authentication procedure of the mobile telephone(S36, S37).

The TRN structure which may process the above operation is defined without defining other packets when establishing a data transmission path, in which the data transmission path connects the call which the user desires to register through the OTASP, to the OTASP operator of the CCSC 50 from the exchange 30, and connects from the mobile telephone 10 to the exchange 30, the PABX 40, the CCSC 50, the OTAF system 60, and to the exchange 30 and the mobile telephone 10.

Referring to the figures, the operation of the present invention will be explained in detail.

First, the OTAR procedure of the mobile telephone through the OTASP method of the mobile communication system will be explained, referring to FIG. 3a.

When a user tries to connect the call through the OTASP after purchasing a mobile telephone 10, desiring to subscribe in a mobile communication service, the user charges the battery of the mobile telephone 10, dials a connecting number for connecting to a corresponding mobile communication provider through an OTASP, pushes a call initiation button, thereby generating the call which requests an OTAR to the communication provider(S11).

An exchange 30 receives the call from the mobile telephone 10, and switches the call to a corresponding PABX 40.

The switched call is connected to an OTASP operator of the CCSC 50 through the PABX 40(S12), and the user of the mobile telephone 10 speaks to the OTASP operator of the CCSC 50 for giving required information while in a call connected status(S13).

On the basis of the information, the OTASP operator of the CCSC 50 identifies credit information of the customer (S14), and determines that the user may subscribe in the mobile communication service or not(S15).

In the case that the user may subscribe to the mobile communication service("YES" branch of S15), a phone number which is allocated to the corresponding mobile telephone is registered on a HLR(S16). After completing registration, the phone number is allocated to the mobile telephone (S18). And then the user resets the mobile telephone power(S19), thereby completing the OTAR operation of the mobile telephone through the OTASP.

After identifying the customer(user) credit status, the operator refuses the registration of the mobile communication service in the case of determining that the customer may not subscribe in("NO" branch of S15).

Now, the TRN packet transmitting procedure of the mobile A<telephone through the OTASP method of the mobile communication system is explaining, referring to FIG. 3b. When the call requests the OTAR through the OTASP, an exchange 30 transmits the call to the corresponding PABX 40 after determining that the call requests the OTAR through the OTASP, and thereby the call is accomplished between the OTASP operator of the CCSC and the customer. At the same time, the exchange 30 generates the TRN packet having the format of FIG. 2 and transmits the TRN packet and voice call(S32), separate from the call between the operator and the user. The speech channel and the signaling channel are separated between the mobile telephone 10 and the base station 20, therefore, it is capable of establishing the data transmission path through the signaling channel while the user speaks to the operator.

The TRN packet is indicated in the FIG. 2a as an example of North America standard. The TRN packet includes an 8-bit header code(a) for indicating that a corresponding call is the OTAR request call through the OTASP, and a 32-bit point code(b) as an exchange identity code for discriminating a corresponding exchange which switches an OTAR call from other exchanges by the OTAF system 60. And the TRN packet also includes a 16-bit mobile telephone identity code(c) for discriminating a corresponding mobile telephone which requests the OTAR from other mobile telephones. Accordingly, the TRN packet is a total of 7 bytes(i.e., 56 bits). Additionally, the code in the TRN packet should have a unique value in case that there are several OTAR request call through the OTASP.

The PABX 40 applies the corresponding TRN packet to the CCSC 50, and the TRN packet is stored in the OTASP operator server of the CCSC 50. While the OTASP operator speaks to the user, the TRN packet stored in the operator server is transmitted to the OTAF system 60 without changing formats in case of pushing an initiation button of the registration(S33).

The OTAF system 60 divides the point code(b) of the exchange 30 by receiving the TRN packet, discriminates which exchange 30 switches the OTAR call through the OTASP, generates a temporary telephone number, and transmits the TRN packet and the temporary telephone number to the corresponding exchange 30 by using the CCS. The temporary telephone number is a unique number.

The exchange 30 divides the mobile telephone identity code(c) of the TRN packet applied from the OTAF system 60, connects to the mobile telephone 10 by using the temporary telephone number, and activates the data transmission path(S35).

The user may give the information required by the operator of the CCSC 50 when registering through the OTASP. Regardless of a conversation between the operator and the user, the data exchange is accomplished through the OTAF system between the CCSC 50 and the mobile telephone 10. In other words, when the mobile telephone 10 and the CCSC 50 are connected to each other through the OTAF system 60, the OTAF system 60 transmits the mobile telephone information(for example, the mobile telephone identity number, key code inputted to the mobile telephone, and etc.) from the corresponding mobile telephone 10 to the CCSC (S36). And the OTAF system carries out an authentication procedure between an authentication center and the mobile telephone 10(S37), generates a value of an authentication key in the mobile telephone, and stores the value in the authentication center.

When completing the above processes, the mobile telephone 10 receives the allocated telephone number, stores the number, and then the user resets the power of the mobile telephone 10. Consequently, all of the OTAR processes are completed.

According to the present invention, there are advantages dividing a corresponding exchange which switches a call of an OTAR mobile telephone, and efficiently registering the mobile telephone through an OTASP such that data paths are established between the CCSC and a mobile telephone in the case of operating a plurality of exchanges, by generating TRN packet having a unique value for each of exchange and each of mobile telephone.

The present invention is not limited to the specifically disclosed embodiments, and variations and modifications may be made without departing from the scope of the present invention.

What is claimed is:

1. In a mobile communication system, a method of OTASP for generating a TRN by an exchange through OTASP, transmitting the TRN to an OTAF system, and providing an OTAR of a mobile telephone through the OTAF system, the method comprising:

inserting in a TRN packet information for discriminating an OTAR request call from other calls, information for discriminating the exchange from other exchanges, and information about the mobile telephone requesting the OTAR request call, and transmitting the TRN packet having the information to the OTAF system through a Private Automatic Branch Exchange (PABX) and a CCSC;

establishing a data transmission path capable of data exchange between the OTAF system and the mobile telephone, and thereby providing the OTAR of the mobile telephone;

in the exchange, generating the TRN packet having information about the OTAR request call, exchange identity information, and mobile telephone identity information after receiving the OTAR request call, transferring the TRN packet having the information, and transferring a voice call to the PABX;

in the PABX, identifying the OTAR request call after checking the TRN packet from the exchange, and directly transmitting the TRN packet and the voice call to an OTASP operator and operator server of the CCSC upon identifying the OTAR request call;

in the CCSC, transmitting the TRN packet to the OTAF system to activate the data transmission path for data exchange with the mobile telephone; and in the OTAF system, establishing the data transmission path after checking the TRN packet;

wherein the TRN packet includes:
  a header code having fixed bits for indicating the OTAR request call through the OTASP, a point code having fixed bits for identifying the exchange which switches the OTAR request call through the OTASP; and
  a mobile telephone identity code having fixed bits for identifying the mobile telephone which requests the OTAR call; and the point code comprises:
  a subsystem number for identifying an equipment type;
  a network number for discriminating a particular region where the exchange is located, from other regions;
  a cluster number discriminating nodes within the region; and
  an exchange number for discriminating the exchange which is located in the particular region, from other exchanges.

2. In a mobile communication system, a method of OTASP for generating a TRN by an exchange through OTASP, transmitting the TRN to an OTAF system, and providing an OTAR of a mobile telephone through the OTAF system, the method comprising:

inserting in a TRN packet information for discriminating an OTAR request call from other calls, information for discriminating the exchange from other exchanges, and information about the mobile telephone requesting the OTAR request call, and transmitting the TRN packet having the information to the OTAF system through a Private Automatic Branch Exchange (PABX) and a CCSC;

establishing a data transmission path capable of data exchange between the OTAF system and the mobile telephone, and thereby providing the OTAR of the mobile telephone;

in the exchange, generating the TRN packet having information about the OTAR request call, exchange identity information, and mobile telephone identity information after receiving the OTAR request call, transferring the TRN packet having the information, and transferring a voice call to the PABX;

in the PABX, identifying the OTAR request call after checking the TRN packet from the exchange, and directly transmitting the TRN packet and the voice call to an OTASP operator and operator server of the CCSC upon identifying the OTAR request call;

in the CCSC, transmitting the TRN packet to the OTAF system to activate the data transmission path for data exchange with the mobile telephone; and in the OTAF system, establishing the data transmission path after checking the TRN packet;

wherein the TRN packet includes:
  a header code having fixed bits for indicating the OTAR request call through the OTASP, a point code having fixed bits for identifying the exchange which switches the OTAR request call through the OTASP; and
  a mobile telephone identity code having fixed bits for identifying the mobile telephone which requests the OTAR call; and wherein the OTAF system separates the point code from the TRN packet and discriminates the exchange which switches the OTAR request call through the OTASP, from other exchanges and separates the mobile telephone identity code from the TRN packet and discriminates the mobile telephone which requests the OTAR request call from other calls to establish the data transmission path to connect between the exchange and the mobile telephone which are related to the current OTAR request call.

3. In a mobile communication system, a method of OTASP for generating a TRN by an exchange through OTASP, transmitting the TRN to an OTAF system, and providing an OTAR of a mobile telephone through the OTAF system, the method comprising:

inserting in a TRN packet information for discriminating an OTAR request call from other calls, information for discriminating the exchange from other exchanges, and information about the mobile telephone requesting the OTAR request call, and transmitting the TRN packet having the information to the OTAF system through a Private Automatic Branch Exchange (PABX) and a CCSC;

establishing a data transmission path capable of data exchange between the OTAF system and the mobile telephone, and thereby providing the OTAR of the mobile telephone;

in the exchange, generating the TRN packet having information about the OTAR request call, exchange identity information, and mobile telephone identity information after receiving the OTAR request call, transferring the TRN packet having the information, and transferring a voice call to the PABX;

in the PABX, identifying the OTAR request call after checking the TRN packet from the exchange, and directly transmitting the TRN packet and the voice call to an OTASP operator and operator server of the CCSC upon identifying the OTAR request call;

in the CCSC, transmitting the TRN packet to the OTAF system to activate the data transmission path for data exchange with the mobile telephone; and in the OTAF system, establishing the data transmission path after checking the TRN packet;

wherein the TRN packet includes:
  a header code having fixed bits for indicating the OTAR request call through the OTASP, a point code having fixed bits for identifying the exchange which switches the OTAR request call through the OTASP; and
  a mobile telephone identity code having fixed bits for identifying the mobile telephone which requests the OTAR call; and wherein the point code further comprises:
  a subsystem number for identifying an equipment type; and
  a network number for discriminating a region where the exchange is located, from other regions.

4. In a mobile communication system, a method of OTASP for generating a TRN by an exchange through OTASP, transmitting the TRN to an OTAF system, and providing an OTAR of a mobile telephone through the OTAF system, the method comprising:
  inserting in a TRN packet information for discriminating an OTAR request call from other calls, information for discriminating the exchange from other exchanges, and information about the mobile telephone requesting the OTAR request call, and transmitting the TRN packet having the information to the OTAF system through a Private Automatic Branch Exchange (PABX) and a CCSC;
  establishing a data transmission path capable of data exchange between the OTAF system and the mobile telephone, and thereby providing the OTAR of the mobile telephone;
  in the exchange, generating the TRN packet having information about the OTAR request call, exchange identity information, and mobile telephone identity information after receiving the OTAR request call, transferring the TRN packet having the information, and transferring a voice call to the PABX;
  in the PABX, identifying the OTAR request call after checking the TRN packet from the exchange, and directly transmitting the TRN packet and the voice call to an OTASP operator and operator server of the CCSC upon identifying the OTAR request call;
  in the CCSC, transmitting the TRN packet to the OTAF system to activate the data transmission path for data exchange with the mobile telephone; and
  in the OTAF system, establishing the data transmission path after checking the TRN packet;
  wherein the TRN packet further comprises:
    a header code having fixed bits for indicating the OTAR request call through the OTASP, a point code having fixed bits for identifying the exchange which switches the OTAR request call through the OTASP; and
    a mobile telephone identity code having fixed bits for identifying the mobile telephone which requests the OTAR call; and
  wherein the PABX divides the header code from the TRN packet and identifies the OTAR request call by the header code.

5. In a mobile communication system, a method of Over the Air Service Provisioning (OTASP) for generating a Temporary Reference Number (TRN) by an exchange through OTASP, transmitting the TRN to an Over the Air service provisioning Function (OTAF) system, and providing an Over the Air Registration (OTAR) of a mobile telephone through the OTAF system, the method comprising:
  inserting in a TRN packet information for discriminating an OTAR request call through the OTASP from other calls, and information for establishing a data transmission path capable of data exchange between an OTASP operator server of a Customer Care Service Center (CCSC) and the mobile telephone requesting the OTAR;
  transmitting the TRN packet having said information to the CCSC;
  the TRN packet further comprises:
    a header code having fixed bits for indicating the OTAR request call;
    a point code having fixed bits for identifying the exchange which switches the OTAR request call; and
    a mobile telephone identity code having fixed bits for identifying the mobile telephone which requests the OTAR call; and
  the point code further comprises:
    a subsystem number for identifying an equipment type;
    a network number for discriminating a corresponding region where the exchange is located from other regions; and
    an exchange number for discriminating an exchange which is located in a corresponding region from other exchanges.

6. In a mobile communication system, a method of Over the Air Service Provisioning (OTASP) for generating a Temporary Reference Number (TRN) by an exchange through OTASP, transmitting the TRN to an Over the Air service provisioning Function (OTAF) system, and providing an Over the Air Registration (OTAR) of a mobile telephone through the OTAF system, the method comprising:
  inserting in a TRN packet information for discriminating an OTAR request call through the OTASP from other calls, and information for establishing a data transmission path capable of data exchange between an OTASP operator server of a Customer Care Service Center (CCSC) and the mobile telephone requesting the OTAR; and
  transmitting the TRN packet having said information to the CCSC;
  the TRN packet further comprises:
    a header code having fixed b its for indicating the OTAR request call;
    a point code having fixed bits for identifying the exchange which switches the OTAR request call; and
    a mobile telephone identity code having fixed bits for identifying the mobile telephone which requests the OTAR call; and
  the point code includes a subsystem number for identifying an equipment type and a network number for discriminating a region where the exchange is located from other regions.

* * * * *